United States Patent
Bellows et al.

(10) Patent No.: US 7,306,653 B2
(45) Date of Patent: Dec. 11, 2007

(54) CONDENSING DEAERATING VENT LINE FOR STEAM GENERATING SYSTEMS

(75) Inventors: James C. Bellows, Maitland, FL (US); Fred W. Shoemaker, Longwood, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 364 days.

(21) Appl. No.: 10/971,184

(22) Filed: Oct. 22, 2004

(65) Prior Publication Data

US 2006/0086248 A1  Apr. 27, 2006

(51) Int. Cl.
*B01D 47/00* (2006.01)
(52) U.S. Cl. .............. 95/210; 95/288; 96/272; 96/290; 96/325; 96/327
(58) Field of Classification Search .......... 96/272, 96/290, 299, 300, 322, 325, 327; 95/210, 95/211, 288
See application file for complete search history.

(56) References Cited

U.S. PATENT DOCUMENTS

| | | | |
|---|---|---|---|
| 4,106,559 A | 8/1978 | Ritland | |
| 4,511,376 A * | 4/1985 | Coury | 95/256 |
| 4,534,174 A * | 8/1985 | Awerbuch et al. | 60/641.5 |
| 4,840,766 A | 6/1989 | Nakamura | |
| 4,917,178 A * | 4/1990 | Kosson et al. | 165/111 |
| 5,209,763 A * | 5/1993 | Pack | 95/264 |
| 5,728,200 A * | 3/1998 | Bekedam | 96/158 |
| 6,019,819 A | 2/2000 | Williams | |
| 6,276,442 B1 | 8/2001 | Rasmussen | |

* cited by examiner

*Primary Examiner*—Duane Smith
*Assistant Examiner*—Sonji Turner

(57) ABSTRACT

The present invention comprises an apparatus and method for efficiently venting impurities from a heat recovery steam generator system by concentrating the impurities in a condensing deaerating vent line 40 and then venting a proportionately small amount of steam with a proportionately high concentration of impurities. The condensing deaerating vent line 40 is attached to a low pressure drum 10, and feed water 54 may be added to the upper portion of the condensing deaerating vent line 40 to improve condensation and conserve thermal energy.

17 Claims, 3 Drawing Sheets

US 7,306,653 B2

CONDENSING DEAERATING VENT LINE FOR STEAM GENERATING SYSTEMS

FIELD OF THE INVENTION

The present invention relates to heat recovery steam generators (HRSG), and more particularly to the venting of volatile impurities within the HRSG.

BACKGROUND OF THE INVENTION

FIG. 1 illustrates a heat recovery steam generator (HRSG), which is used to turn otherwise wasted hot gasses into useful steam. Hot gasses enter 2 the HRSG from sources such as a gas turbine (not shown). In a HRSG, the hot gasses pass over heat transfer surfaces made up of tubes, usually with fins, in which water, under pressure is converted to steam. The heat from the hot gasses are transferred to either water, steam, or a combination of water and steam in a boiler tube, which is a type of heat exchanger. The steam rises in the tubes and is collected in a series of three drums, usually a high pressure (HP) drum 6, an intermediate pressure (IP) drum 8, and a low pressure (LP) drum 10. Ultimately, the hot gasses, after being depleted of most of their useful heat, are vented 4.

The internal workings of the HRSG in relation to the LP drum are shown in a schematic in FIG. 2. As is the convention, thick lines represent the passage of steam and thin lines the flow of water. Within the HRSG the LP drum 10 is used as the source of water for the boiler feedpump 15, which provides water, and eventually steam, to the HP and IP turbines 16. Eventually all steam, from the HP turbine, the IP turbine, the LP drum 10 and other sources goes to the LP turbine 18, where the last of the heat energy in the steam is changed into mechanical (rotary) energy. The remaining steam is passed to the condenser 20 where it is converted back into water, referred to herein as recycled condensate.

In the condenser steam passes over cooled tubes and condenses. The condenser is constructed so that non-condensable (volatile) materials are concentrated and removed by a vacuum pump as air exhaust 22. This process removes non-ionic impurities reasonably effectively, but ionic impurities, such as carbonic acid remain in the water phase. Makeup feed water 21 is added to the condenser to replace losses. The bulk of the flow from the condenser is steam recycled as condensate.

Since the HRSG is a closed system, volatile impurities present in the feed water are transferred to the produced steam, and then to the turbines (or turbine bypasses), then eventually to the condenser 20. During normal operations, only a small volume of ionogenic gas leaves the condenser 20 through the air exhaust 22, leaving a large portion of the ionogenic impurities in the recycled condensate. The recycled condensate is then pumped back to the LP drum as recycled water and the process is repeated without ridding the system of the volatile impurities.

Types of volatile impurities include ammonia, carbonates, such as $CO_2$, and other chemicals. Concentrations as small as 10 parts per billion (ppb, µg/kg) are considered high, while a concentration of 100 ppb may quickly initiate corrosion that eventually leads failure of the turbine or other parts of the steam system. The corrosivity of volatile components varies, but some are clearly corrosive. Others may be more important as they blind the chemistry monitors to more corrosive but less volatile chemicals.

In the prior art, the volatile impurities are removed from the system by mass venting steam from the drums. This needs to be performed at startup of the HRSG, since the drum needs to be of sufficient temperature, and the HRSG system cannot operate while the drum is mass venting. Furthermore, in order to vent the volatile impurities, a large quantity of steam needs to be vented which wastes considerable amounts of water and heat, and creates noise pollution. Depending on the temperature in the drum at the time of venting and the quantity of volatile impurities, the mass venting process can last for 20-40 minutes, and vents 150,000-250,000 lbs of steam per hour (68,000-114,000 kg/hr). Over the course of a year over six million pounds (2.7 million kg) of steam can be vented in to rid the HRSG of volatile impurities.

It is possible to use purified water to reduce the impurities present. However, this is extremely expensive, and it is usually cheaper to vent impurities than use purified feed water. Further, volatiles, such as carbon dioxide continue to enter the system regardless of the purification and continue to create the problems discussed.

What is needed is an apparatus and method that can rid a system of volatile impurities without wasting large amounts of water and heat. Further what is needed is an apparatus and method that can rid a system of volatile impurities continuously during operation.

SUMMARY OF THE INVENTION

With the foregoing in mind, methods and apparatuses consistent with the present invention provide for efficiently venting impurities derived from feed water from a HRSG system by concentrating the impurities into a condensing deaerating vent line and then venting a proportionately small amount of steam with a proportionately high concentration of impurities. The condensing deaerating vent line is attached to the LP drum of the HRSG, and concentrates impurities while minimizing the volume of steam vented and the amount of heat lost to the venting process.

In one embodiment water is taken from the recycled condensate and injected into the top of the condensing deaerating vent line to aid condensation in the line. In another embodiment the condensing deaerating vent line is filled with distillation packing.

These and other objects, features, and advantages in accordance with the present invention are provided in one embodiment the present invention the provides a method for venting volatile impurities from a steam system comprising inserting a condensing deaerating vent line into a location on the steam system where the condensing deaerating vent line contacts a steam flow and where the steam flow is an initial generation of steam for the steam system. A portion of the steam is then drawn into the condensing deaerating vent line and from that portion a condensate and a steam with concentrated volatile impurities is produced. The condensate is returned to the steam system and the steam with concentrated volatile impurities is expelled from the steam system. In a particular embodiment the expelling of the steam with concentrated volatile impurities is performed continuously during normal operation of the steam system.

In another embodiment the present invention provides a method for venting steam containing volatile impurities from a heat recovery steam generator comprising generating steam within a LP drum, where the steam contains at least a portion of the volatile impurities and attaching a condensing deaerating vent line to the LP drum. At least a portion of the steam is then vented into the condensing deaerating vent line where the condensing deaerating vent line condenses a portion of the steam in the vent line forming a condensate.

The remaining steam in the condensing deaerating vent line contains an increased proportion of the volatile impurities forming a concentrated steam within the vent line and this is then vented from the vent line out of the LP drum.

In another embodiment the present invention provides an apparatus for venting volatile impurities from a heat recovery steam generator comprising a LP drum, where the LP drum receives feed water and recycled condensate water that contain the volatile impurities, and where the LP drum converts at least some of the feed water and the recycled condensate water into steam where the steam contains a higher concentration of the volatile impurities than the feed water and the recycled condensate water. At least one condensing deaerating vent line is attached to the LP drum, where a portion of the steam is vented to the vent line during normal operation of the heat recovery steam generator: In one embodiment the condensing deaerating vent line condenses a portion of the steam in the vent line forming a condensate, where the condensate contains a lower concentration of the volatile impurities than the remaining steam in the condensing deaerating vent line, and where the condensate reenters the LP drum. In one embodiment a water source is added to an upper portion of the vent line, and in a particular embodiment the water source is taken from a recycled condensate preheated outlet of the heat recovery steam generator.

BRIEF DESCRIPTION OF THE FIGURES

The invention is explained in more detail by way of example with reference to the following drawings.

DETAILED DESCRIPTION OF THE INVENTION

Figure 1:
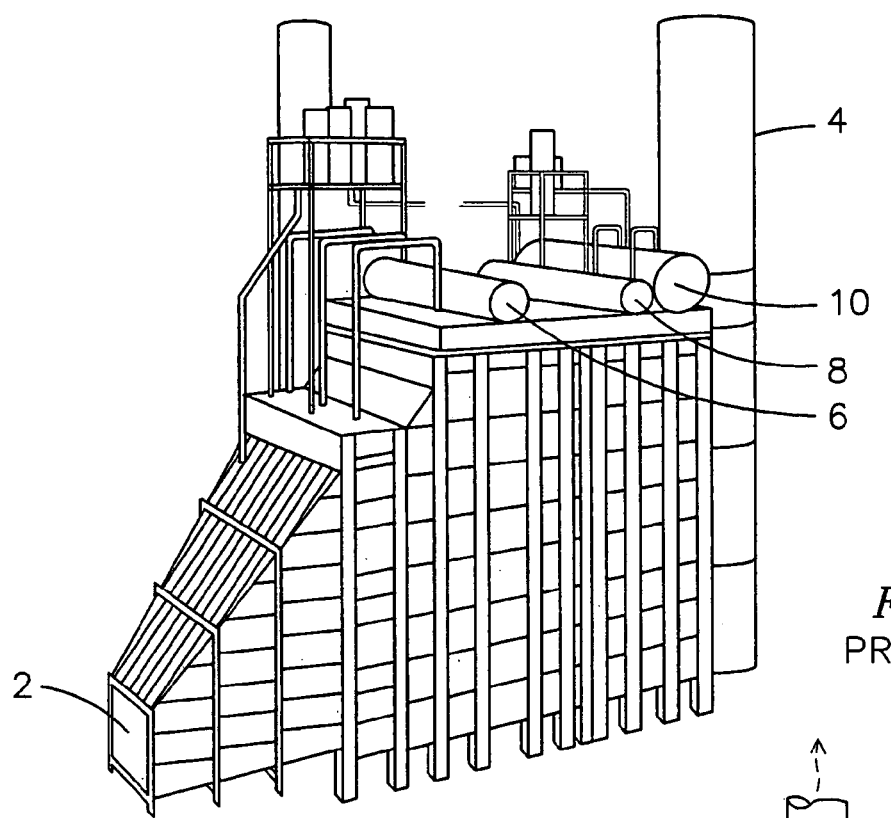
FIG. 1 illustrates a HRSG according to the prior art.

In order to purge a HRSG of volatile impurities that are present in feed water and are otherwise obtained from the environment, large quantities of steam need to be vented from the drums of the HRSG. This venting is only done during start-up of the HRSG, since large quantities of steam cannot be vented during normal operation. Without mass venting, the impurities build up in the system and cause corrosion of parts and other malfunctions. However, mass venting can cause the loss from the HRSG system of more than six million pounds (2.7 million kg) of otherwise useable steam each year.

The present invention seeks to avoid most of this wasted steam by providing a method and apparatus for continuously venting a small amount of steam that has a high concentration of the volatile impurities. By venting only a small amount of steam, millions more pounds of steam can be put to the use of producing energy. Further, since only a small amount of steam is being vented to the environment, millions of pounds of feed water is being saved. In addition, time otherwise spent during start up of a HRSG to venting volatile impurities can, with the use of the present invention, be spent producing energy.

The present invention will also lower corrosion levels in the HRSG, since instead of being allowed to build up before venting, the volatile impurities are continuously being vented from the system. Subsequently, the time between need to mass vent volatile impurities is greatly extended. Also, the time needed to mass vent the impurities will also be reduced depending upon the levels of accumulated impurities.

In one embodiment the present invention provides for a condensing deaerating vent line that is attached to the LP drum of a HRSG. The condensing deaerating vent line draws some of the steam produced in the LP drum. Since the LP drum is the first place that feed water and recycled condensate water are transformed at least partially into steam, removing the volatile impurities at this point reduces damage to the other parts of the HRSG. In other embodiments, however, a condensing deaerating vent line is added to other drums in the HRSG, either in substitution of or in addition to the condensing deaerating vent line on the LP drum.

A portion of the steam produced in the LP drum is drawn into the condensing deaerating vent line. As the steam passes up the deaerating vent line a substantial portion of it is condensed back into water, which then reenters the LP drum. Therefore, as the remaining steam passes higher and higher in the condensing deaerating vent line, the concentration of volatile impurities in the steam increases, until only a small amount of the steam is vented with a high concentration of the volatile impurities. In optimal embodiments, the condensing deaerating vent line releases approximately 10-60 lbs per hour (5-30 kg/hr), and the concentration of the volatile impurities can be as high as 1,000 ppm. As discussed, the present invention will remove volatile impurities during normal operation of the HRSG, and not just during startup.

Figure 3:
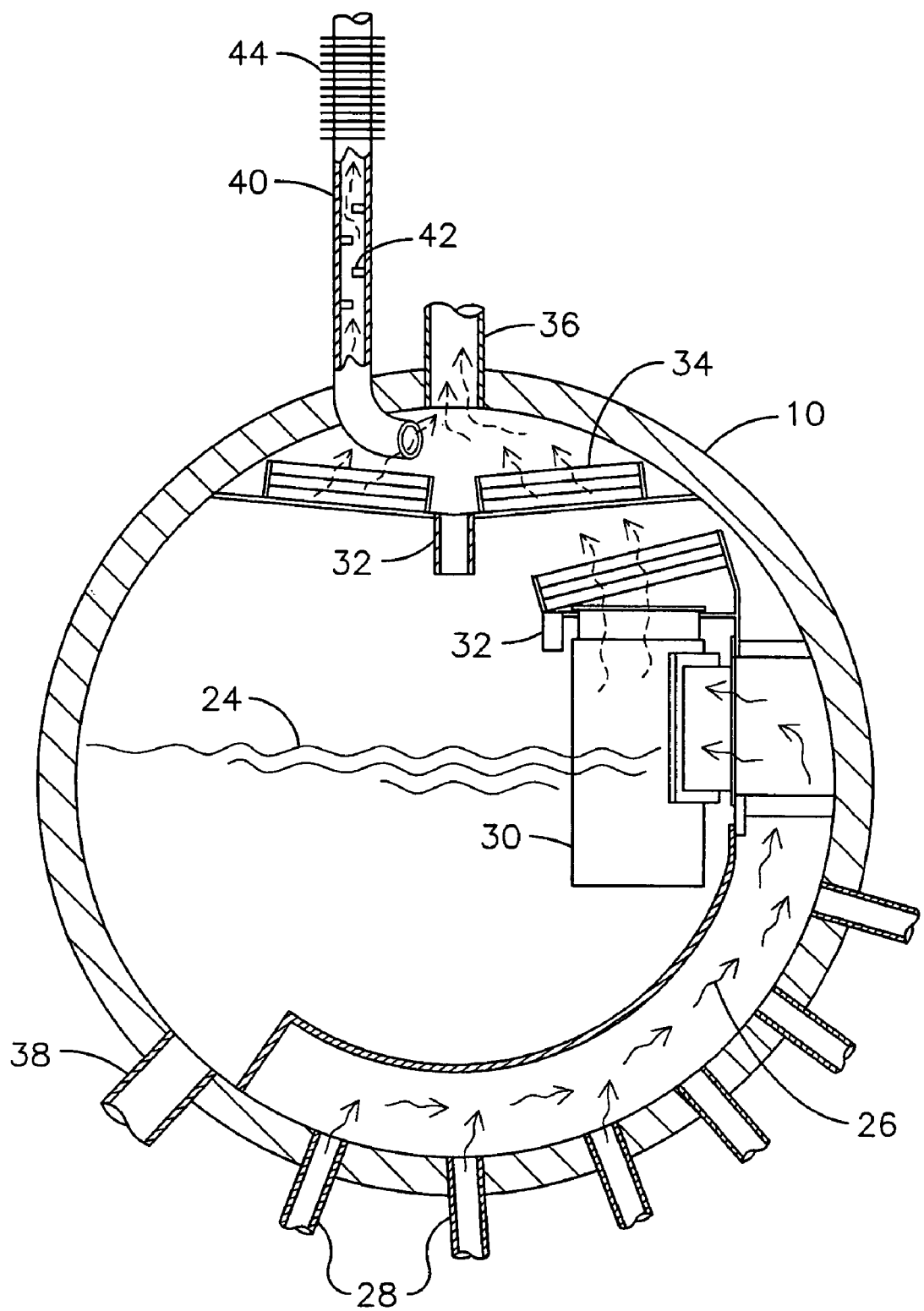
FIG. 3 illustrates a cross-sectional view of a LP drum according to one embodiment of the present invention.

FIG. 3 illustrates one embodiment of the present invention of a condensing deaerating vent line 40 incorporated into a LP drum 10 during normal operation. The LP drum 10 functions by drawing a mixture of water and steam 26 from evaporators, which are essentially heat exchangers that draw heat from the hot gasses entering the HRSG and transfer it to water. The water and steam mixture 26, which tends to be as low as 10% steam, is then drawn through ports 28 into cyclones 30 that spin the water and steam mixture to separate out the steam. For simplicity only on cyclone 30 is shown in this figure, although it would likely have two or even more. The steam then passes through one or more sets of chevrons 34, which change the direction of the steam very quickly. Suspended water droplets cannot follow the direction change and drain back into the main water reservoir 24 via drains 32 that are removed from the path of the steam flow. The separated water 24 is then drawn out of the LP drum 38 where it gets reheated.

Figure 2:
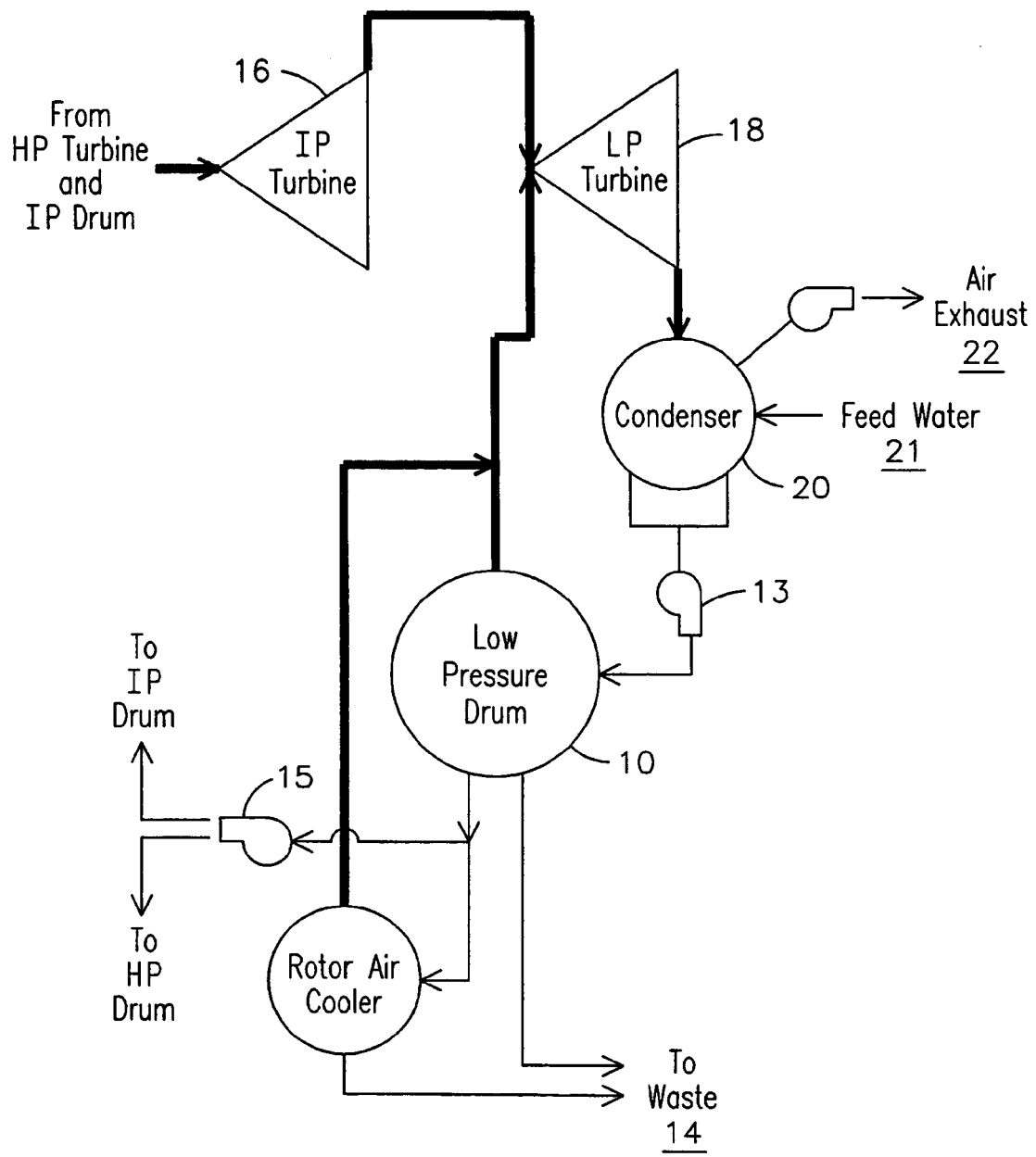
FIG. 2 is a schematic of the LP drum section of a HRSG according to the prior art.

The steam passes out 36 of the LP drum where it is used in the turbines as described in FIG. 2. A portion of the steam, however, is drawn into the condensing deaerating vent line 40. As it passes up the deaerating vent line a large portion of the steam condenses back into water to form a condensate separating the water from the volatile impurities. In some embodiments, the separation can be aided by distillation packing 42 in the deaerating vent line, or by fins 44 that aid in the thermal exchange with the outside environment. Distillation packing 44 is known in the art and essentially forces rising steam though a circuitous route, which increases surface area and approach to equilibrium. The type of distillation packing will depend on a variety of factors, such as the length of the deaerating vent line, the volatility of the impurities and the desired amount of steam to be ultimately vented.

Ultimately the steam rising up the vent line will have a higher and higher concentration of the volatile impurities until a relatively low volume of steam is vented with a relatively high concentration of impurities. As discussed, the amount of steam leaving deaerating vent line can be varied depending on need, however during normal operations of the HRSG approximately 10-60 lbs per hour (5-30 kg/hr) of steam will be vented. Since not all of the steam generated in the LP drum is vented, it might still be necessary to do a mass venting, though with much less frequency. Mass venting may be reduced even more by the addition of multiple condensing deaerating vent lines attached to the LP drum, as well as condensing deaerating vent lines on other drums in the HRSG, and even in other locations on the HRSG such as a steam line or condenser.

The length of the condensing deaerating vent line can be varied. In certain embodiments, though it is over 9 feet (3 m) in length, and will have an essentially vertical stance. Since the condensing deaerating vent line will necessarily be exposed to high concentrations of impurities, the line should be manufactured out of corrosion resistant materials. Examples of such materials are stainless steals.

Figure 4:
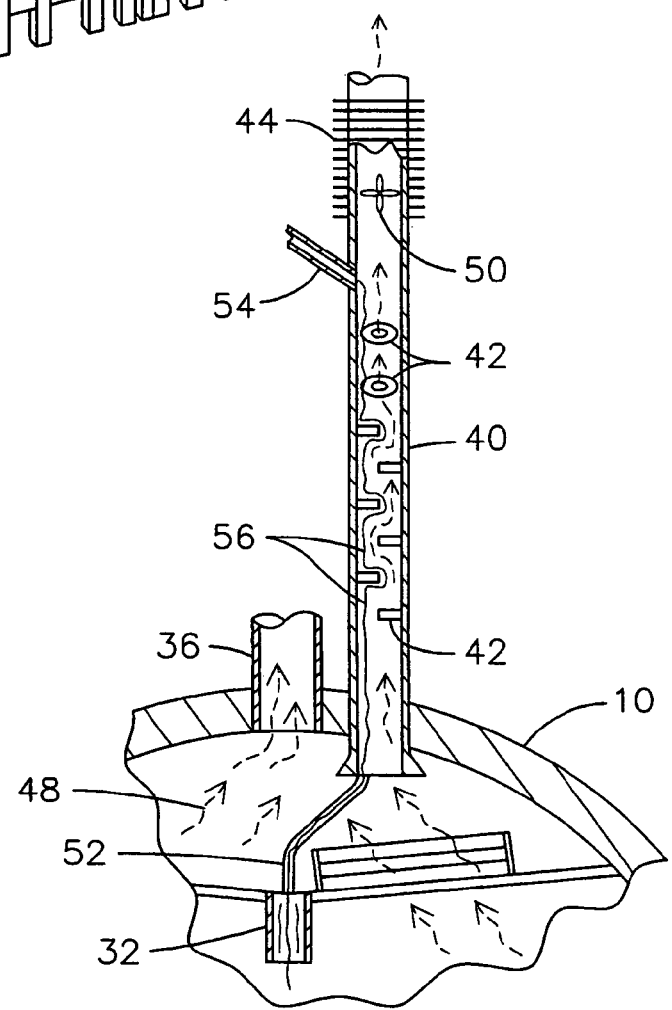
FIG. 4 illustrates a close up view of a condensing deaerating vent line attached to an LP drum according to one embodiment of the present invention.

Referring to FIG. 4, a close up view of another embodiment of the present invention is illustrated. The condensing deaerating vent line 40 is attached to the LP drum 10 with an opening in the path of the steam flow 48. In other embodiments the condensing deaerating vent line may have multiple opening in the steam flow, and even multiple branches that lead to multiple openings in steam flows from different cyclones. This embodiment illustrates a couple of different types of distillation packing 42 as well as a fan 50 disposed towards the top of the condensing deaerating vent line 40. Also at the top of the deaerating vent line would be a valve (not shown) to maintain pressure in the line and prevent excess loss of steam.

In the embodiment shown in FIG. 4 a water source is added 54 towards the top of the condensing deaerating vent line 40. The water may be from any relatively cool source, but is particularly unheated recycled condensate from the condenser. In this manner, the recycled condensate is heated by steam that is otherwise released to the environment. Water flowing down the line 56, whether from the recycled condensate, feed water or condensate formed within the condensing deaerating vent line 40 reenters the LP drum 10. To avoid contacting rising steam, the water is diverted to a down spout 52 and then to a drain 32. Within the line itself may be further channels and filters to shunt condensate to the down spout 52 and the drain 32. Other ways of routing the condensate to avoid the steam flow will be apparent to one of ordinary skill in the art.

In FIGS. 3 and 4 the condensing deaerating vent line 40 is shown as substantially entering the LP drum. In other embodiments the condensing deaerating vent line is flush with the wall of the LP drum. Also illustrated in FIGS. 3 and 4 is a condensing deaerating vent line 40 with no branches. In other embodiments the condensing deaerating vent line has multiple branches, both within the LP drum and outside of it.

Although the present invention has hereto been explained in terms of its exemplary embodiment, the present invention is equally applicable to other steam systems. As applied to the other steam systems, the present invention in the preferred embodiment would apply the condensing deaerating vent line to the portion of the steam system that first generates the steam, which would contain a high concentration of volatile impurities.

In one embodiment the present invention provides a method for venting volatile impurities from a steam system comprising inserting a condensing deaerating vent line into a location on the steam system where the condensing deaerating vent line contacts a steam flow and where the steam flow is an initial generation of steam for the steam system. A portion of the steam is then drawn into the condensing deaerating vent line and from that portion a condensate and a steam with concentrated volatile impurities is produced. The condensate is returned to the steam system and the steam with concentrated volatile impurities is expelled from the steam system. In a particular embodiment the expelling of the steam with concentrated volatile impurities is performed continuously during normal operation of the steam system.

In another embodiment the present invention provides a method for venting steam containing volatile impurities from a heat recovery steam generator comprising generating steam within a LP drum, where the steam contains at least a portion of the volatile impurities and attaching a condensing deaerating vent line to the LP drum. At least a portion of the steam is then vented into the condensing deaerating vent line where the condensing deaerating vent line condenses a portion of the steam in the vent line forming a condensate. The remaining steam in the condensing deaerating vent line contains an increased proportion of the volatile impurities forming a concentrated steam within the vent line and this is then vented from the vent line out of the LP drum.

In one embodiment the venting of the concentrated steam from the vent line occurs continuously during operation of the heat recovery steam generator. In another embodiment a water source is added an upper portion of the condensing deaerating vent line. In a particular embodiment the water source is taken from a condensate preheated outlet of the heat recovery steam generator, which is condensate from the condenser before it is heated.

In another embodiment the condensing deaerating vent line is at least 9 feet (3 m) in length. In still another embodiment the condensing deaerating vent line is filled with a distillation packing, and in a particular embodiment the condensing deaerating vent line has multiple fins to aid in thermal exchange with the environment.

In another embodiment the present invention provides an apparatus for venting volatile impurities from a heat recovery steam generator comprising a LP drum, where the LP drum receives feed water and recycled condensate water that contain the volatile impurities, and where the LP drum converts at least some of the feed water and the recycled condensate water into steam where the steam contains a higher concentration of the volatile impurities than the feed water and the recycled condensate water. At least one condensing deaerating vent line is attached to the LP drum, where a portion of the steam is vented to the vent line during normal operation of the heat recovery steam generator. In one embodiment the condensing deaerating vent line condenses a portion of the steam in the vent line forming a condensate, where the condensate contains a lower concentration of the volatile impurities than the remaining steam in the condensing deaerating vent line, and where the condensate reenters the LP drum. In one embodiment a water source is added to an upper portion of the vent line, and in a particular embodiment the water source is taken from a recycled condensate preheated outlet of the heat recovery steam generator.

In a particular embodiment the condensate reenters the LP drum in an area that does not substantially contact with the steam. In another embodiment the condensing deaerating vent line comprises a plurality of branches, and in still another embodiment the the condensing deaerating vent line is manufactured from corrosion resistant materials.

The term water as used herein refers to the molecule in its liquid state. Recycled condensate refers to condensate produced from the condenser, while the term condensate refers to condensate produced in the condensing deaerating vent line.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A method for venting steam containing volatile impurities from a heat recovery steam generator comprising:
    generating steam within a low pressure drum, wherein said steam contains at least a portion of said volatile impurities;
    attaching a condensing deaerating vent line to said low pressure drum, said condensing deaereting vent line having a plurality of fins to aid in thermal exchange with the environment:
    releasing at least a portion of said steam into said condensing deaerating vent line;
    wherein said condensing deaerating vent line condenses a portion of said steam in said vent line forming a condensate, wherein remaining steam in said condensing deaerating vent line contains an increased proportion of said volatile impurities forming a concentrated steam within said vent line; and
    venting said concentrated steam from said vent line.

2. The method of claim 1, wherein the venting of said concentrated steam from said vent line occurs continuously during operation of said heat recovery steam generator.

3. The method of claim 1, further comprising adding a water source to an upper portion of said condensing deserating vent line.

4. The method of claim 3, wherein said water source is taken from recycled condensate of said heat recovery steam generator.

5. The method of claim 1, wherein said condensing deaerating vent line is filled with a distillation packing.

6. The method of claim 1, wherein said condensing deaerating vent line is at least 9 feet (3 m) in length.

7. An apparatus for venting volatile impurities from a heat recovery steam generator comprising:
    low pressure drum, wherein said low pressure drum receives feed water and recycled condensate water that contain said volatile impurities, and wherein said low pressure drum converts at least some of said feed water and said recycled condensate water into steam, and wherein said steam contains a higher concentration of said volatile impurities than said feed water and said recycled condensate water;
    at least one condensing deaerating vent line attached to said low pressure drum, said vent line having a plurality of fins to aid in thermal exchange with the environment, and
    wherein a portion of said steam is vented to said vent line during normal operation of said heat recovery steam generator.

8. The apparatus of claim 7, wherein said condensing deaerating vent line condenses a portion of said steam in said vent line forming a condensate, and wherein said condensate contains a lower concentration of said volatile impurities than the remaining steam in said condensing deaerating vent line, and wherein said condensate reenters said low pressure drum.

9. The apparatus of claim 8, wherein said condensate reenters said low pressure drum in an area that does not substantially contact with said steam.

10. The apparatus of claim 7, wherein said condensing deserating vent line comprises a plurality of branches.

11. The apparatus of claim 7, wherein said vent line is at least 9 feet (3 m) in length.

12. The apparatus of claim 7, wherein said vent line is filled with a distillation packing.

13. The apparatus of claim 7, wherein a water source is added to an upper portion of said vent line.

14. The apparatus of claim 13, wherein said water source is taken from a recycled condensate preheated outlet of said heat recovery steam generator.

15. The apparatus of claim 13, wherein said water source is taken from feed water of said heat recovery steam generator.

16. The apparatus of claim 7, said condensing deaerating vent line is manufactured from corrosion resistant materials.

17. An apparatus for venting volatile impurities from a heat recovery steam generator comprising:
    a low pressure drum, wherein said low pressure drum receives feed water and recycled condensate water that contain said volatile impurities, and wherein said low pressure drum converts at least some of said feed water and said recycled condensate water into steam, and wherein said steam contains a higher concentration of said volatile impurities than said feed water and said recycled condensate water;
    at least one condensing deserating vent line attached to said low pressure drum, said vent line being at least 9 feet (3 m) in length, and
    wherein a portion, of said steam is vented to said vent line during normal operation of said heat recovery steam generator.

* * * * *